United States Patent [19]

Roll

[11] 3,879,540
[45] Apr. 22, 1975

[54] METHODS AND CYCLOPENTYL BENZAMIDE COMPOSITIONS FOR PRODUCING DEPRESSANT ACTIVITY

[75] Inventor: William D. Roll, Toledo, Ohio

[73] Assignee: The University of Toledo, Toledo, Ohio

[22] Filed: June 17, 1974

[21] Appl. No.: 479,620

Related U.S. Application Data

[63] Continuation-in-part of Ser. No. 253,520, May 15, 1972, Pat. No. 3,825,595, which is a continuation-in-part of Ser. No. 123,842, March 12, 1971, abandoned.

[52] U.S. Cl. .............................................. 424/324
[51] Int. Cl. .............................................. A61k 27/00
[58] Field of Search .................................... 424/324

[56] References Cited
OTHER PUBLICATIONS
Roll, J. Med. Chem., Vol. 13, pp. 303–304, (1970).

Primary Examiner—Stanley J. Friedman

[57] ABSTRACT

Simultaneously acting depressants to the central nervous system and the cardiovascular system of the formula

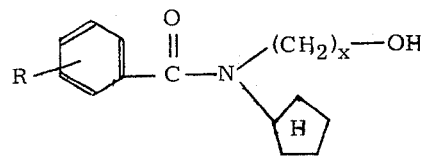

wherein R is selected from the group consisting of hydrogen, lower alkyl, lower alkoxy, and halogen radicals; and wherein $x$ is a whole number from 1 to 3.

26 Claims, No Drawings

METHODS AND CYCLOPENTYL BENZAMIDE COMPOSITIONS FOR PRODUCING DEPRESSANT ACTIVITY

RELATED APPLICATIONS

This is a continuation-in-part of applicant's copending application Ser. No. 253,520 filed May 15, 1972, now U.S. Pat. No. 3,825,595; which was a continuation-in-part of applicant's abandoned application Ser. No. 123,842 filed Mar. 12, 1971.

BACKGROUND OF THE INVENTION

Although similar N-hydroxyalkyl benzamides are known, only applicant's own article published in the Journal of Medicinal Chemistry Volume 13, pages 303-4 (March, 1970) showed these compounds to have both CNS depressant and blood pressure depressor effects. Example of other similar compounds not having both these effects are: the Margolis U.S. Pat. No. 2,999,050 patented Sept. 5, 1961 for a skeletal muscle relaxant; the Horrom U.S. Pat. No. 3,066,167 patented Nov. 27, 1962 for skeletal muscle relaxant, tranquilizer, anti-convulsant, and anti-emetic activities; the Paulshock U.S. Pat. No. 3,342,679 Patented Sept. 19, 1967 for an anti-convulsant; and V. D. Wiebel Hans et al. article in the Journal of Laboratory and Clinical Medicine Volume 49, pages 651-6 (April, 1957) which only refers to a metabolite excreted in urine.

SUMMARY OF THE INVENTION

The new compounds of this invention have central nervous system (CNS) depressant activity in small animals such as rats and mice, and in dosages of 5 milligrams per kilogram of the animal, they also produce a reduction in blood pressure in these animals.

The new compounds have the general formula:

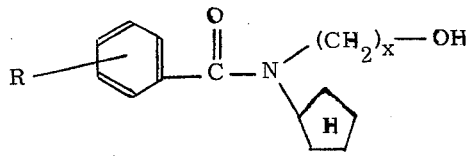

wherein R may be mono-di- or tri-, fluoro-, chloro-, bromo-, iodo-, trifluoromethyl-, methoxy-, ethoxy-, methyl-, or ethyl- radical substituted in the ortho-, meta-, and para-positions, but preferably monochloro-, monomethoxy- or monomethyl-radical in the para-position. The N-radical of the benzamide may comprise a hydroxymethyl-, hydroxyethyl-, or hydroxypropyl-radical, but preferably the 2-hydroxyethyl - radical, which together with the halo-, methoxy-, or methyl - radicals on the phenyl ring of the benzamide confers the proper physicochemical properties on these compounds which are necessary for maximal activity in the animals tested. Although the N-2-hydroxyethyl- radical is preferred, the N-2 -hydroxypropylradical also is good. The N-2-hydroxymethyl is less effective than N-2-hydroxyethyl-radical, and those N-2-hydroxyalkyl radicals of four or more carbon atoms produce no significant depressant action in any practical dosages. Furthermore these N-cyclopentyl-N-2-hydroxyalkyl ring substituted benzamides were found to have superior depressant and hypotensive effects to applicant's cyclohexyl compounds mentioned in his article above.

The new compounds according to this invention were prepared by the following equation:

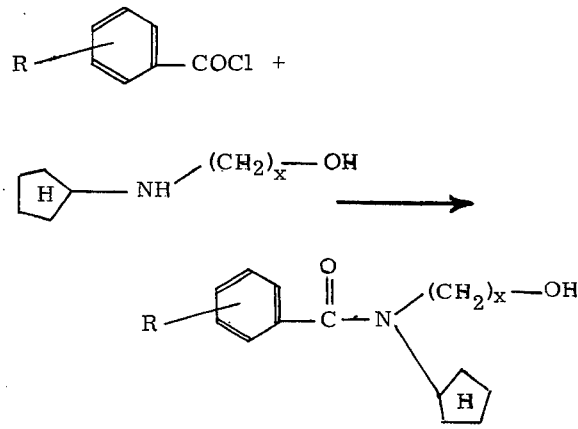

Herein equimolar amounts of the substituted benzoyl or aracyl halide was reacted with a well stirred solution of N - (2-hydroxyalkyl) - cyclopentamine in triethylamine and dimethylacetamide at a temperature between about 0° and 10° C. When the addition of the aracyl halide solution was completed, the crude substituted benzamide was precipitated by the addition of cold water and collected. This crude product was crystallized from aqueous ethanol to give the pure new compounds of this invention, which were tested for composition and physical properties. The results of some of these tests on the preferred N-cyclopentyl-N-2-hydroxyethyl-methoxy-, chloro-, and methyl- benzamides are shown in the following Table I:

TABLE I

| Example Nos. | Phenyl Ring Substituted Radical | % Yield by Above Process | Melting Points in °C | Calculated % C | Calculated % H | Analyzed % C | Analyzed % H |
|---|---|---|---|---|---|---|---|
| 1 | p—CH₃O— | 80 | 60.7 | 68.15 | 8.04 | 68.20 | 8.14 |
| 2 | m—CH₃O— | 71 | Oil | 68.15 | 8.04 | 68.18 | 8.08 |
| 3 | o—CH₃O— | 69 | Oil | 68.15 | 8.04 | 68.10 | 8.00 |
| 4 | p—Cl— | 83 | 101.6 | 62.80 | 6.78 | 62.80 | 6.79 |
| 5 | m—Cl— | 75 | Oil | 62.80 | 6.78 | 62.73 | 6.75 |
| 6 | o—Cl— | 75 | Oil | 62.80 | 6.78 | 62.75 | 6.80 |
| 7 | p—CH₃ | 82 | 40.8 | 72.84 | 8.56 | 72.85 | 8.60 |
| 8 | m—CH₃ | 74 | Oil | 72.84 | 8.56 | 72.80 | 8.60 |
| 9 | o—CH₃ | 68 | Oil | 72.84 | 8.56 | 72.81 | 8.59 |

The infrared absorption for C = 0 was 6.04–6.1 microns and OH was 2.96 microns for each of the above nine examples or compounds.

The activity of these cyclopentyl benzamides was tested by dissolving them in propylene glycol and administering their resulting solutions orally and parenterally into small animals such as rats and mice in dosages of 1, 3, 5 and 7 milligrams per kilogram of weight of the animals administered. The depressant effect of the new compounds was determined in C3H mice weighing between 20 and 25 grams with actophotometers which measure the total movements of a single animal each 15 minute interval over a 1 hour period, and the mean count for each period for eight animals for each compound was recorded. Eight additional mice were administered the same amount of chlorpromazine, a well known CNS depressant and the results obtained are listed in the following table which shows all these new compounds to be more active than chlorpromazine at least in some dosages, and the para substituted benzamides to be the most active.

TABLE II

EFFECTS ON THE SPONTANEOUS ACTIVITY IN MICE

| Compound | Dose, mg/kg | % reduction in spontaneous act |
|---|---|---|
| Chlorpromazine | 1.0 | 2.5 |
|  | 3.0 | 42.4 |
|  | 5.0 | 60.0 |
|  | 7.0 | 75.2 |
| 1 | 1.0 | 10.0 |
|  | 3.0 | 57.5 |
|  | 5.0 | 70.3 |
|  | 7.0 | 91.0 |
| 2 | 1.0 | 8.0 |
|  | 3.0 | 48.9 |
|  | 5.0 | 50.5 |
|  | 7.0 | 73.2 |
| 3 | 1.0 | 15.2 |
|  | 3.0 | 60.4 |
|  | 5.0 | 64.8 |
|  | 7.0 | 80.2 |
| 4 | 1.0 | 15.0 |
|  | 3.0 | 65.2 |
|  | 5.0 | 75.5 |
|  | 7.0 | 96.8 |
| 5 | 1.0 | 10.2 |
|  | 3.0 | 50.0 |
|  | 5.0 | 54.3 |
|  | 7.0 | 77.9 |
| 6 | 1.0 | 8.2 |
|  | 3.0 | 49.5 |
|  | 5.0 | 50.1 |
|  | 7.0 | 69.9 |
| 7 | 1.0 | 15.8 |
|  | 3.0 | 70.1 |
|  | 5.0 | 79.4 |
|  | 7.0 | (100) |
| 8 | 1.0 | 6.9 |
|  | 3.0 | 45.2 |
|  | 5.0 | 56.1 |
|  | 7.0 | 75.3 |
| 9 | 1.0 | 12.7 |
|  | 3.0 | 60.9 |
|  | 5.0 | 68.2 |
|  | 7.0 | 89.9 |

The direct blood pressure measurements for each new compound were conducted in eight Wister rats by injecting 5 mg/kg via the femoral vein. These rats were under urethane anesthesia (1.2 g/kg. i.p), and the direct blood pressure measurements were made with a mercury monometer connected to the carotid artery. Compounds 1, 4 and 7 in Table I showed 50, 60 and 45 mm drops of blood pressure, respectively.

Indirect blood pressure measurements were also conducted in normotensive Wistar rats by injecting 5 mg/kg intraperitoneally, and the systolic blood pressure was determined by using a photoelectric tensometer. The mean response of eight test animals and eight control animals was used to determine the percent reduction in blood pressure produced by each tested compound. The results of these pharmacological tests for each new compound listed in Table I above are shown in the following Table III:

TABLE II

HYPOTENSIVE ACTIVITY IN NORMOTENSIVE RATS

| Compound | % Reduction of control blood pressure (Min. following administration) | | | | |
|---|---|---|---|---|---|
|  | (15) | (30) | (60) | (90) | (120) |
| 1 | 28.0 | 33.1 | 40.0 | 15.0 | 0.0 |
| 4 | 20.5 | 50.9 | 63.6 | 29.2 | 10.5 |
| 7 | 40.8 | 35.5 | 21.2 | 15.3 | 0.0 |

The pharmaceutical compositions of this invention are composed of these cyclopentyl benzamides incorporated in a non-toxic liquid or solid pharmaceutical carrier or excipient. Thus, simple propylene glycol solutions of the active ingredients have been found suitable, however, the active ingredients may be incorporated in pharmaceutical carrier forms, such as tablets or capsules, which may contain other non-toxic materials such as fillers or diluents, namely: lactose, or sucrose, and may contain a binding agent such as glucose, gum acacia, gelatin, starch paste, etc. Furthermore, they may contain lubricants, such as magnesium stearate, talc, etc., as well as such disintegrating agents as corn starch, microcrystalline cellulose, etc. The active ingredients may also be incorporated into injectable solutions which may contain other non-toxic materials including: solvents, such as propylene glycol, water for injection, etc., and preservatives, such as benzyl alcohol, etc.

The unit dosage forms are prepared by standard formulation methods such as by granulating and tableting, by mixing with a carrier and filling into hard gelatin capsules; by dissolving or suspending in a suitable sterile parenteral vehicle; or by dissolving in an aqueous vehicle for an oral liquid dosage form.

The unit dosage forms will contain a sufficient amount of active ingredient to provide effective central nervous system depressant and/or hypotensive activity with correspondingly minimal toxic side effects.

A unit dose range of from approximately 10–150 mg. provides depressant and/or hypotensive activity with minimal side reactions. Such unit doses are administered 1–4 times daily. For calculating the amount of active ingredients in the claimed unit dosage forms, it is often convenient to use milligrams of the active compounds per kilogram of the weight of the animal to which they are administered, depending on the activity of the active ingredient together with the size and pharmacology of the host animal. In such claimed unit dosages, the active compound will be present in approximately 0.5–10 mg./kg. but preferrably 1–7 mg./kg. amounts.

DETAILED DESCRIPTION OF SOME PREFERRED EMBODIMENTS

The following examples are designed to explain the methods of preparation and administration of the compounds of this invention, but it is to be understood that they are not to limit the scope of this invention:

EXAMPLE 1

N-cyclopentyl-N-(2-hydroxyethyl)-p-methoxybenzamide was prepared by adding a mixture of 25 mililiters of dimethylacetamide, 0.01 mole of p-methoxybenzoyl chloride to a cooled solution (ice bath) containing 0.01 mole of N-2-hydroxyethylcyclopentylamine, 25 milliliters of dimethylacetamide and 0.01 mole of triethylamine. When the addition of the p-methoxybenzoyl chloride solution was completed the crude N-cyclopentyl-N-(2-hydroxyethyl)-p-methoxybenzamide was precipitated by the addition of cold water and collected. This crude product was recrystallized from aqueous ethanol to form the pure N-cyclopentyl-N-(2-hydroxyethyl)-p-methoxybenzamide of this Example.

This new compound was then tested according to the Table I above in which the carbon and hydrogen content were obtained with a Coleman Carbon-Hydrogen analyzer. The melting point was determined by using a Mettler FP-1 melting and boiling point apparatus. The infrared absorption spectrum as obtained with a Perkin-Elmer Model 137-B spectrophotometer.

The oral administration of 1, 3, 5 and 7 milligrams per kilogram of this compound dissolved in proylene glycol resulted in a significant reduction in the spontaneous motor activity of the mice (see Table II above).

EXAMPLE 2

N-cyclopentyl-N-(2-hydroxyethyl)-m-methoxybenzamide was prepared from m-methoxybenzoyl chloride and N-(2-hydroxyethyl)cyclopentylamine in the same manner as that employed in Example 1 above. The resulting compound was also tested as described in Example 1 above, and as shown in Tables I, II above.

EXAMPLE 3

N-cyclopentyl-N-(2-hydroxyethyl) -o- methoxybenzamide also was produced in the manner described in Example 1 above. This new compound was similarly tested as described above and as shown in Tables I, II, and III. It was shown to have both CNS depressant and blood pressure depressor activity in dosages of 5 mg./kg.

EXAMPLE 4

N-cyclopentyl-N-(2-hydroxyethyl)-p-chlorobenzamide was also produced according to the process described for Example 1 above and similarly tested as shown in Tables, I, II and III. Oral and intraperitoneal doses of this compound of 5 milligrams per kilogram in propylene glycol produced a high degree of depression and blood pressure depressor activity as shown in Tables II and III above.

EXAMPLE 5

N-cyclopentyl-N-(2-hydroxyethyl)-m-chlorobenzamide was produced similar to the process described in Example 3, and it had pharmocological effects similar to those for the compound of Example 2 as shown in Table II.

EXAMPLE 6

N-cyclopentyl-N-(2-hydroxyethyl)-o-chlorobenzamide was produced according to the process described for Example 1 and was tested to have properties about the same as the compound of Example 2.

EXAMPLE 7

N-cyclopentyl-N-(2-hydroxyethyl)-p-methylbenzamide was produced according to the process described for Example 1 and was tested to have properties as shown in Tables I, II and III. This compound had the greatest CNS depressant action, and its blood pressure depressor action had the fastest onset.

EXAMPLE 8

N-cyclopentyl-N-(2-hydroxyethyl)-m-methylbenzamide was produced according to the process described for Example 1 and was tested to have properties as shown in Tables I and II.

EXAMPLE 9

N-cyclopentyl-N-(2-hydroxyethyl)-o-methylbenzamide as produced according to the process described for Example 1 and was tested to have properties as shown in Tables I and II.

EXAMPLE 10

| Tablet Formulation | Gm./Tablet |
| --- | --- |
| Active Ingredient | 0.025 |
| Lactose | 0.150 |
| Sucrose | 0.025 |
| Corn Starch | 0.015 |
| Stearic Acid | 0.003 |

These ingredients are granulated and compressed by standard pharmaceutical methods.

EXAMPLE 11

| Capsule Formulation | Gm./Capsule |
| --- | --- |
| Active Ingredient | 0.025 |
| Magnesium Stearate | 0.002 |
| Lactose, qs ad | 0.300 |

These ingredients are screened, mixed and filled into hard gelatine capsules.

EXAMPLE 12

| Oral Elixir Formulation | Gm./Capsule |
| --- | --- |
| Active Ingredient | 400 mg. |
| Aromatic Elixir, USP, to make | 1000 cc. |

EXAMPLE 13

| Parenteral Formulation | |
| --- | --- |
| Active Ingredient | 0.040 o/o |
| Propylene glycol | 60.00 o/o |
| Benzyl alcohol | 2.00 o/o |
| Water for injection, USP, qs ad | 100.00 o/o |

While there is described above the principles of this invention in connection with specific products, it is to

I claim:

1. A method of producing a depressant and hypotensive activity in a host animal needing such treatment, comprising administering internally to said host animal a non-toxic but effective quantity of a compound of the formula:

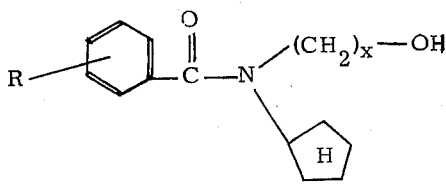

wherein R is selected from the group consisting of methyl, methoxy, and chloro radicals, and wherein $x$ is a whole number from 1 to 3.

2. A method according to claim 1 wherein the R radical is located in the para-position of the phenyl ring.
3. A method according to claim 1 wherein $x$ is 2.
4. A method according to claim 1 wherein R is methyl.
5. A method according to claim 1 wherein R is methoxy.
6. A method according to claim 1 wherein R is chloro.
7. A method according to claim 1 wherein said compound is N-cyclopentyl-N-2-hydroxyethyl-p-methylbenzamide.
8. A method according to claim 1 wherein said compound is N-cyclopentyl-N-2-hydroxyethyl-m-methylbenzamide.
9. A method according to claim 1 wherein said compound is N-cyclopentyl-N-2-hydroxyethyl-o-methylbenzamide.
10. A method according to claim 1 wherein said compound is N-cyclopentyl-N-2-hydroxyethyl-p-chlorobenzamide.
11. A method according to claim 1 wherein said compound is N-cyclopentyl-N-2-hydroxyethyl-m-chlorobenzamide.
12. A method according to claim 1 wherein said compound is N-cyclopentyl-N-2-hydroxyethyl-o-chlorobenzamide.
13. A method according to claim 1 wherein said compound is N-cyclopentyl-N-2-hydroxyethyl-p-methoxybenzamide.
14. A method according to claim 1 wherein said compound is N-cyclopentyl-N-2-hydroxyethyl-m-methoxybenzamide.
15. A method according to claim 1 wherein said compound is N-cyclopentyl-N-2-hydroxyethyl-o-methoxybenzamide.
16. A method according to claim 1 wherein the quantity of said compound administered is between about 0.5 and 10 milligrams per kilogram of the host animal.
17. A method according to claim 1 wherein the quantity of said compound administered is between about 1 and 7 milligram per kilogram of the host animal.
18. A method according to claim 1 wherein said compound together with a pharmaceutically acceptable carrier is administered in a unit dose composition in the form of a capsule, tablet, elixir or parenteral formulation.
19. A depressant and hypotensive pharmaceutical composition comprising an effective amount of compounds of the formula.

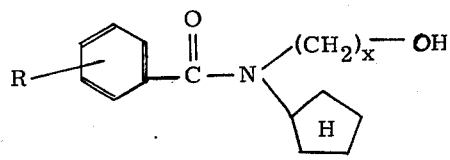

wherein R is selected from the group consisting of methyl, methoxy, and chloro radicals, and wherein $x$ is a whole number from 1 to 3, together with a pharmaceutically acceptable carrier.

20. A composition according to claim 19 wherein $x$ is 2.
21. A composition according to claim 19 wherein R is methyl.
22. A composition according to claim 19 wherein R is methoxy.
23. A composition according to claim 19 wherein R is chloro.
24. A composition according to claim 19 wherein said compound is N-cyclopentyl-N-2-hydroxytehyl-p-methylbenzamide.
25. A composition according to claim 19 wherein said compound is N-cyclopentyl-N-2-hydroxyethyl-p-chlorobenzamide.
26. A composition according to claim 19 wherein said compound is N-cyclopentyl-N-2-hydroxyethyl-p-methoxybenzamide.

* * * * *